(12) United States Patent
Lenhard et al.

(10) Patent No.: US 7,471,437 B2
(45) Date of Patent: Dec. 30, 2008

(54) ELECTROCHROMIC MATERIALS AND DEVICES

(75) Inventors: Jerome R. Lenhard, Fairport, NY (US); Deepak Shukla, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 732 days.

(21) Appl. No.: 10/813,885

(22) Filed: Mar. 31, 2004

(65) Prior Publication Data

US 2005/0219678 A1    Oct. 6, 2005

(51) Int. Cl.
 *G02F 1/15*    (2006.01)
(52) U.S. Cl. .................................................. 359/265
(58) Field of Classification Search ......... 359/265–275; 345/49, 105; 348/817
See application file for complete search history.

(56) References Cited

U.S. PATENT DOCUMENTS

| 4,324,622 | A | * | 4/1982 | Deb ........................... 430/63 |
| 4,514,481 | A | * | 4/1985 | Scozzafava et al. ...... 430/58.15 |
| 4,902,108 | A |   | 2/1990 | Byker |
| 5,128,700 | A |   | 7/1992 | Inoue et al. |
| 6,301,038 | B1 |  | 10/2001 | Fitzmaurice et al. |
| 6,433,914 | B1 |  | 8/2002 | Lomprey et al. |
| 6,605,239 | B2 |  | 8/2003 | Fitzmaurice et al. |
| 2002/0181068 | A1 | | 12/2002 | Bonhote et al. |

FOREIGN PATENT DOCUMENTS

| WO | 97/35227 | 9/1997 |
| WO | 98/03267 | 1/1998 |
| WO | 98/35267 | 8/1998 |
| WO | 01/27690 A2 | 4/2001 |

OTHER PUBLICATIONS

N. Rowley and R. Mortimer, "New Electrochromic Materials", Science Progress (2002), 85 (3), 243-262.

(Continued)

*Primary Examiner*—Joseph Martinez
(74) *Attorney, Agent, or Firm*—J. Lanny Tucker

(57) ABSTRACT

The present invention relates to an electrochromic material, and a device utilizing the electrochromic material, comprising a substituted-1,1-dioxo-thiopyran of the general structure I:

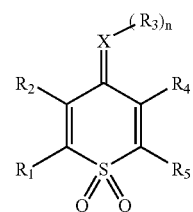

wherein:
  X is carbon, nitrogen, oxygen, or sulfur;
  n is 0, 1 or 2;
  $R_3$ is independently an electron withdrawing group or a substituted or unsubstituted alky or aryl group;
  $R_1$ and $R_5$ each independently represent a substituted or unsubstituted alkyl group, a substituted or unsubstituted aryl group, or a substituted or unsubstituted heterocyclic group; and
  $R_2$ and $R_4$ each independently represent hydrogen, or an electron withdrawing group, or a substituted or unsubstituted alkyl group.

81 Claims, 3 Drawing Sheets

OTHER PUBLICATIONS

"Electrochromic Materials", in Proceedings of the Electrochemical Society, K. Ho, C. Greenberg, D. MacArthur, eds., vol. 96-24, 1997, pp. 1-13, Pennington, NJ.
A. Sammells et. al., J. Electrochem. Soc., 1986, vol. 133, 1270-1271.
Displays (1999) 20, pp. 137-144.
Gratzel et. al. in J. Amer. Chem. Soc., 1993, vol. 115, 6382-6390.
Fitzmaurice et. al, J. Phys. Chem. B 2000, vol. 104, 11449-1459.

A. Schmidt, M.L. Anderson: "Electronic states of vapor deposited electron and hole transport agents and luminescent materials for light-emitting diodes", J.Appl.Phys., vol. 78, No. 9, Nov. 1, 1995, pp. 5619-5625, XP002334161.
Hisaya Sato, Hisaaki Matsuda: "Synthesis and characterization of electron transporting polymers having thioxznthene derivatives", Synthetic Metals, vol. 105, 1999, pp. 55-60, XP002334162.

* cited by examiner

ELECTROCHROMIC MATERIALS AND DEVICES

FIELD OF THE INVENTION

The present invention relates to electrochromic materials for use in various devices.

BACKGROUND OF THE INVENTION

Electrochromic materials, that is, materials that change color oxidation or reduction, have become of increased commercial importance. Electrochromic devices are electrochemical cells that comprise an anode, a cathode, an electrolyte, and one or more electrochromic materials that are either surface confined or in solution, and provide a means to change light absorption properties of the device such that a color change is observable as a result of the electrochemical reaction at one (or both) electrode(s) (anode and cathode).

A wide variety of electrochromic materials and devices have been described. Electrochromic devices have found use as smart windows, automatically dimmable mirrors, and as static or modulated displays. Reviews on the various categories of electrochromophoric materials have been published. (See for example, N. Rowley and R. Mortimer, "New Electrochromic Materials", Science Progress (2002), 85 (3), 243-262 and "Electrochromic Materials", in Proceedings of the Electrochemical Society, K. Ho, C. Greenberg, D. MacArthur, eds., Volume 96-23, 1997). The most important classes of compounds which demonstrate the electrochromic effect are: transition metal oxides, prussian blue systems, viologens, conducting polymers, and transition metal and lanthanide coordination complexes.

Electrochromic systems employing the metal oxides as electrophores exploit the color change of a layer of transition metal oxide, for example, $WO_3$, $NiO$, $MoO_3$, $IrO_2$ or $Co_2O_3$ deposited on a transparent conductive electrode. A closely related device utilizes prussian blue (inorganic "polymeric" materials based on iron ferricyanides such as $Fe^{II}Fe^{III}(CN)_6^-$ and analogs) as the electrochromic material. Because the color change in systems that employ these inorganic electrochromic materials is a result of the intercalation of counterions from the electrolyte into the bulk of the inorganic layer during oxidation or reduction, the associated color changes in such devices are rather slow, on the order of tens of seconds even for relatively small area devices. Response time may be improved by making the metal oxide layer very thin, but this leads to low contrast devices that are unacceptable. In addition to having relatively slow response times, these materials also exhibit broad absorption bands. Thus, these inorganic electrochromic systems are presently limited in their application to electrochromic window applications.

Electrochromic polymers have been widely studied and can offer a range of color changes during oxidation or reduction. Most prevalent have been polymers formed by the chemical or electrochemical oxidation of aromatic compounds such as pyrolle, thiophene, aniline, furan, carbazole, azulene, and indole. Electrochromic devices have been described wherein the electrochromic polymer has been deposited as a film on a transparent conducting substrate. Many of the polymeric electrochromophores have limited stability in the oxidized or reduced states. Limitations due to slow response time during operation of the devices is also encountered as counterions must diffuse into and out of the polymeric layer in order to maintain charge balance.

Transition metal complexes and phthalocyanines have also been explored for use as electrochromic materials but have found limited application.

Molecular electrochromic materials that change color upon oxidation or reduction have recently received much attention. By far the most utilized group of electrochromic materials are the 1,1'-disubstituted-4,4'-bipyridinium salts, better known as viologens. The electrochromophore molecules may be dissolved in an electrolyte solution sandwiched between two opposing transparent electrodes. Such devices comprising at least one soluble molecular electrochromophore and a second soluble (molecular) or insoluble (metal oxide or prussian blue) electrochromophore have been described in U.S. Pat. Nos. 6,433,914, 4,902,108, and 5,128,700. A variation on this design utilizes electrochromophore molecules that are bound to, or otherwise incorporated into, a polymeric film deposited on a transparent conducting electrode, as disclosed in A. Sammells et. al., J. Electrochem. Soc., 1986, vol. 133, 1270; "Electrochromic Materials", Ho and Greenberg, editors, 1997, The Electrochemical Society, Inc., Pennington, N.J. Alternatively, electrochromophore molecules can be directly attached either by a chemisorption or a chemical bond forming method to the surface of a transparent, nanocrystalline film electrode. The attachment of a monolayer of electrochromophore molecules to transparent, high surface area, nanoporous-nanocrystalline semiconducting electrodes can yield devices with high electrochromic contrast changes and relatively short switching times. Such nanocrystalline electrochromic devices are described in Displays (1999) 20, pp. 137-144, Fitzmaurice et. al, J. Phys. Chem. B 2000, vol. 104, 11449-1459, WO-A-97/35227, WO-A-98/35267, U.S. Pat. Nos. 6,301,038, 6,605,239, WO127690, WO 98/3267, and U.S. Pat. Application No. 2002/0181068, U.S. Pat. Application No. 2002/0021482A1 (comprises at least one electrode incorporating a semiconducting nanostructured metal oxide film modified by chemisorption of a molecular electrochromophore).

By virtue of the nanoporous nature of the nanocrystalline metal oxide films, the monolayer of chemisorbed electrochromic molecules are in contact with both the electrode and the electrolyte solution containing the counterions, and thus facilitate fast charge-compensation during the electrochromic redox processes and ensure rapid switching time. The nanoporous-nanocrystalline metal oxide that has been shown to possess good film forming qualities and have the high conductivity and transparency is TiO2 as disclosed in Gratzel et. al. in J. Amer. Chem. Soc., 1993, vol 115, 6382. Nanocrystalline SnO2 has also been described for use in electrochromic devices in Fitzmaurice et. al, J. Phys. Chem. B 2000, vol. 104, 11449-1459.

In addition, for use in combination with transparent nanocrystalline metal oxide electrodes, such as TiO2, it is necessary for the electrochromophore to have a redox potential that lies close to the conduction band edge of TiO2 at the liquid-electrolyte interface in order to reversibly transfer electrons from the conduction band to the molecular electrochromophore. Thus it is necessary for the molecule to undergo a color change upon electroreduction when used with TiO2.

Molecular electrochromophores that have been shown to undergo a reversible color change from a transparent, or lightly colored, state to a stable, intensely colored, (radical) state upon electroreduction include viologens, related diazapyreniums, perylenedicarboximides, and napthtalenedicarboximides. Molecular electrochromophores that have been shown to undergo a color change from a transparent, or lightly colored, state to a stable, intensely colored, (radical) state upon electrooxidation include phenothiazines, triarylamines, substituted phenylendiamines, and ferrocene, among others.

The viologens are the most studied and commercially utilized molecular electrochromophore materials. The dicationic form, that is, the oxidized form, is colorless and can be electroreduced to produce a stable, intensely colored radical cation. Suitable choice of nitrogen substituents to attain the appropriate molecular orbital energy levels can, in principle, allow color choice of the radical cation. Viologens containing short alkyl chains yield blue-purple colored radical cations. Those containing longer chains or aromatic-ring containing substituents tend to give crimson colored radicals due to charge-transfer complexation (dimerization) of various viologen states. The typical N,N'-dialkylviologen cation radical exhibits a maximum absorption around 600 nm with an extinction coefficient between 10,000 and 20,000 $M^{-1}cm^{-1}$ in an organic solvent. The viologens have, in general, low electrochemical reduction potentials (for example between −0.1 and −0.5 V vs SCE) and thus well suited for use with nanocrystalline $TiO_2$ materials. Although viologen electrochromophores give stable and intense colored radical states, the viologens are disadvantaged in that the variety of synthetically allowable substitutions and range of colors attainable is quite limited. Furthermore, the soluble forms of viologens, in particular, N,N'-dimethylviologen, are known carcinogens and thus pose serious health concerns regarding the manufacture and disposal of electrochromic devices containing such materials.

Other electrochromophores, for example those from the perylenedicarboximide and naphthalenedicarboximide class may have low electrochemical reduction potentials, however they are difficult to synthesize and are difficult to utilize because of very limited solubility in common solvents.

Although a vast number of organic molecules, particularly in conjugated carbocyclic and heterocyclic aromatic compounds, undergo color change upon electrochemical oxidation or reduction, there are only a limited number of such molecules that have found high interest or practical use in electrochromophoric systems. Desirable features for a molecular electrochromophore include a high degree of transparency in the visible color region in the "off" state (non-reduced or non-oxidized states, high absorption in visible spectral region upon electroreduction or electrooxidation ("on" state), low electrochemical potential for reduction/oxidation, high stability in the "on" or "off" state (bi-stable), color tunability by synthetic variation of the parent molecular structure, convenient synthesis, high solubility in common solvents, and low toxicity. Preferred electrochromophores are those that undergo the highest contrast change upon oxidation or reduction, that is, from a colorless to a highly colored state, or from a colored state to a colorless one. Less desirable are electrochromophores that change from one colored state to different colored state upon oxidation or reduction.

Problem to be Solved

There is a continuing need for novel and improved electrochromophoric molecules especially those that exhibit a high contrast electrochromic effect, have a low electrochemical potential, have synthetically tunable color, are bi-stable, soluble in common solvents, and are non-carcinogenic. It is an object of the present invention to provide such novel electrochromophore materials for use in various electrochromic devices.

SUMMARY OF THE INVENTION

The present invention relates to an electrochromic material, and a device utilizing the electrochromic material, comprising a substituted-1,1-dioxo-thiopyran of the general structure I:

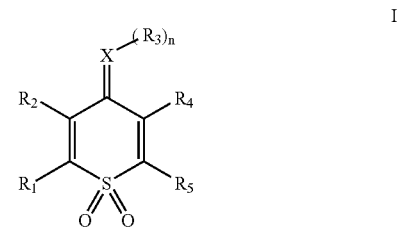

wherein:
X is carbon, nitrogen, oxygen, or sulfur;
n is 0, 1 or 2;
R3 is independently an electron withdrawing group or a substituted or unsubstituted alky or aryl group;
R1 and R5 each independently represent a substituted or unsubstituted alkyl group, a substituted or unsubstituted aryl group, or a substituted or unsubstituted heterocyclic group; and
R2 and R4 each independently represent hydrogen, or an electron withdrawing group, or a substituted or unsubstituted alkyl group.

Advantageous Effect of the Invention

The present invention includes several advantages, not all of which are incorporated in a single embodiment. The electrochromic materials of the present invention have ideal properties for application as electrophores in electrochromic displays and devices. One electron reduction of these thiopyrans yields intensely colored, highly stable, radicals which are very useful for electrochromic applications. The color of the corresponding thioyran radicals is easily varied by convenient synthetic manipulations of the parent structure. Novel materials for electrochromic application, color tunability, bi-stable, non toxic, low operation voltage due low electrochemical reduction potential.

DETAILED DESCRIPTION OF THE INVENTION

Figure 1:
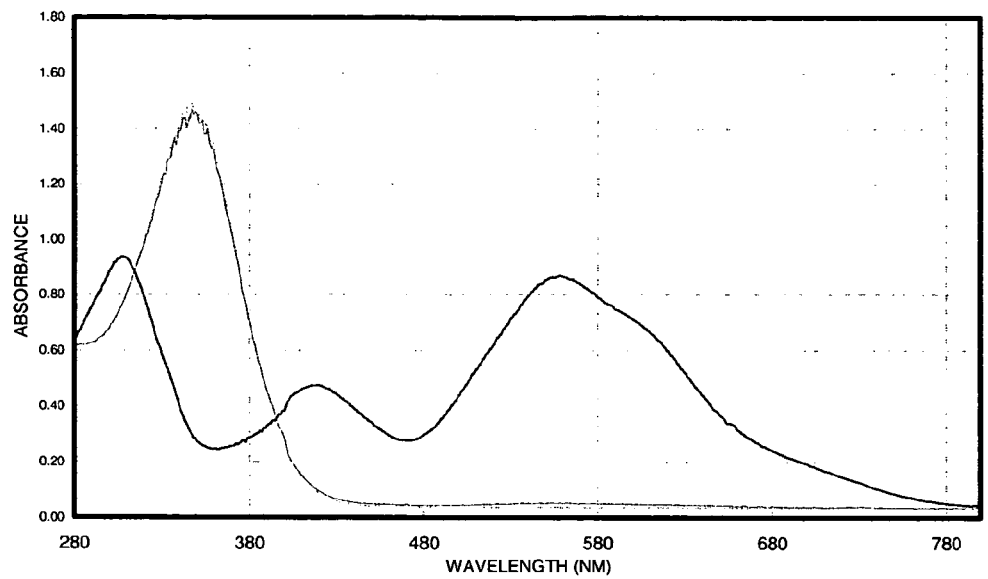
FIG. 1 illustrates the spectra of electrolyte solution of 2,6-di-(3-trifluorophenyl)-4H-1,1-dioxo-4-(dicyanomethylidene)thiopyran (I-6) with applied potential of 0 V (dashed curve), −0.3 V (dashed curve), and again at 0 V (dotted curve).

The present invention relates to a new class of electrochromophores, also referred to herein as electrochromic materials, specifically disubstituted-dioxo-thiopyran electrochromophores, and electrochromic devices employing such, particularly suitable for reversible filtering or optical display. The preferred electrochromophores have high coloration and contrast, bi-stability, low reduction potential, color tunability, and low toxicity.

Substituted-1,1-dioxo-thiopyrans of the general structure I, shown below, exhibit desirable features for an electrochromophore for use in an electrochromic device.

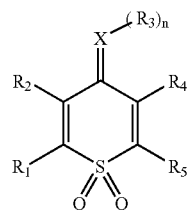

wherein X is carbon, nitrogen, oxygen, or sulfur; n is 0, 1 or 2; R3 is independently an electron withdrawing group or a substituted or unsubstituted alky or aryl group; R1 and R5 each independently represent a substituted or unsubstituted alkyl group, a substituted or unsubstituted aryl group, or a substituted or unsubstituted heterocyclic group (for example, pyridine, pyrolle, furan, thienyl); and R2 and R4 each independently represent hydrogen, or an electron withdrawing group, or a substituted or unsubstituted alkyl group.

For example, R3 may be an electron withdrawing group such as halogen, cyano, COOH, $CO_2CH_3$, $CO_2$-alky, CON$(C_2H_5)_2$, $SO_2CH_3$, $SO_2$-aryl $SO_2CF_3$, $SO_2$-alkyl, $PO_3H_2$, $SO_3H$, $B(OH)_2$, or $SO_2N(C_2H_5)_2$]. In one embodiment, when n>0, R3 may also be separately or independently substituted or unsubstituted aryl or substituted or unsubstituted alkyl. Additionally, R3 together with the carbon atoms to which they are attached may form a fused saturated or unsaturated 5 or 6-membered ring containing one or more electron withdrawing groups.

For example, R1 and R5 may represent a substituted or unsubstituted alkyl group, a substituted or unsubstituted aryl group such as phenyl, naphthyl, or a substituted or unsubstituted heterocyclic group such as pyridine, pyrolle, furan, or thienyl.

R2 and R4 may each independently represent hydrogen, or an electron withdrawing group, such as halogen, cyano, COOH, $CO_2CH_3$, $CO_2$-alky, CON$(C_2H_5)_2$, $SO_2CH_3$, $SO_2$-aryl $SO_2CF_3$, $PO_3H_2$, $SO_3H$, $B(OH)_2$, $SO_2N(C_2H_5)_2$] or a substituted or unsubstituted alkyl group, a substituted or unsubstituted aryl group such as phenyl or naphthyl, or a substituted or unsubstituted heterocyclic group such as pyridine, pyrolle, furan, or thienyl.

R1 and R2 or R4 and R5 together with the carbon atoms to which they are attached may form a fused saturated or unsaturated 5 or 6-membered ring. In one embodiment, the electrochromic material of formula I has X equal to carbon and the value of n is 2. In another embodiment, X equals nitrogen and n is 1. In another embodiment, X is equal to oxygen or sulfur, and the value of n is 0.

The term "aryl" or "aryl group" as used herein means both unsubstituted aryl groups, such as phenyl or naphthyl, and substituted aryl groups. The term "substituted" as used herein in reference to a group, such as aryl group, means that such group is substituted by a group, such as lower alkyl, lower alkene, nitro, halo, primary, secondary or tertiary amino, cyano, sulfate, carboxylate, phosphonates, and the like. The term "halogen" as used herein means fluorine, chlorine, bromine, or iodine. Lower alkyl refers to alkyl groups having from 1 to 6 carbon atoms, for example methyl, ethyl and the like. Further, with regard to any alkyl, alkylene group or alkenyl group, it will be understood that these can be branched or unbranched and include ring structures. Substituted-1,1-dioxo-thiopyrans of the general structure I are preferably 2,6-disubstituted-1,1-dioxo-thiopyrans.

Synthetic routes for the preparation of the intermediate 4H-thiopyran-4-one 1,1-dioxides with a variety of substituents at the 2- and 6-positions have been described in U.S. Pat. Nos. 4,514,482, 5,039,585, as well as in N. Rule, M. Detty, J. Kaeding, J. Sinicroopi, J. Org. Chem. 1995, 60, 1665, and C. Chen, G. Reynolds, H. Luss, J. Perlstein. J. Org. Chem. 1986, 51, 3282. The thiopyran-4-one intermediates are easily converted into dicyanomethylidene and related derivatives, as disclosed in M. Detty, R. Eachus, J. Sinicropi, J. Lenhard, M. McMillan, A. Lanzafame, H. Luss, R. Young, J. Eilers, J. Org. Chem. 1995, 60, 1674, all incorporated herein by reference.

The invention described herein also provides for thiopyran electrochromophores that incorporate functional groups that facilitate the irreversible chemisorption nanocrystalline metal oxide electrodes. Particularly useful functional groups are those that readily bind to active sites at the surface of the $TiO_2$ or SnO2 to nanocrystallites that constitute a nanoporous-nanocrystalline film. As defined above these functional groups may be included as part of the substituent groups R1 thru R5. Preferred groups that facilitate irreversible chemisorption are those previously shown to possess a strong affinity towards $Ti^{IV}$, or $Sn^{IV}$ that is, carboxylates, salicylates, or phosphonates, and the like. One or more of these groups may be included in general structure I. Illustrative examples of electrochromophore I are listed below, but the present invention should not be construed as being limited thereto.

I-1 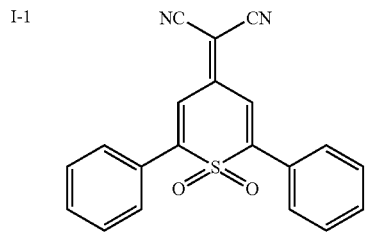
I-2 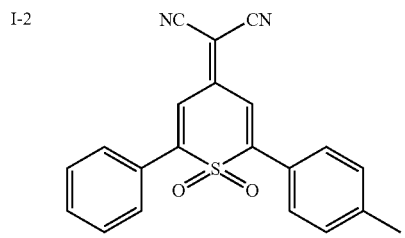
I-3 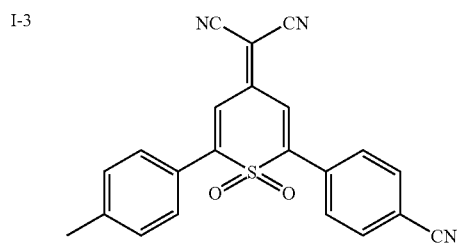
I-4 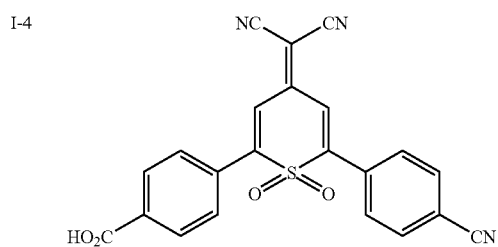
I-5 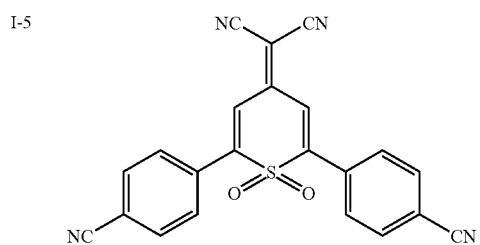
I-6 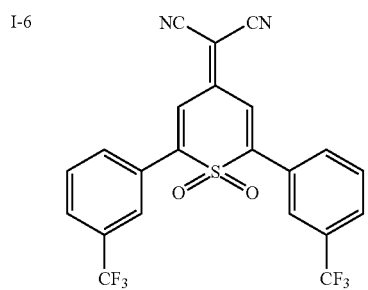

-continued
I-7 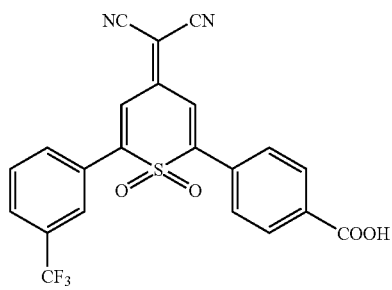
I-8 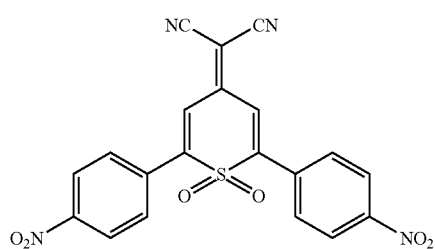
I-9 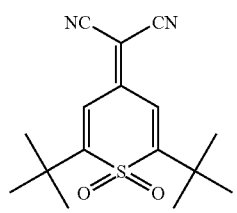
I-10 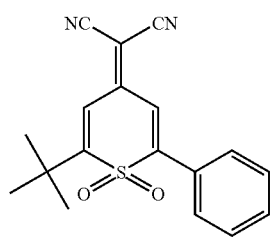
I-11 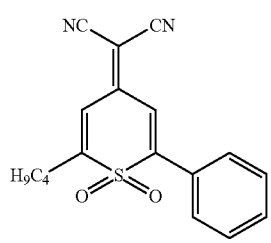
I-12 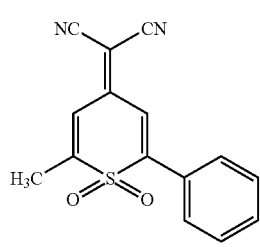

-continued
I-13
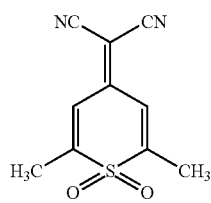
I-14
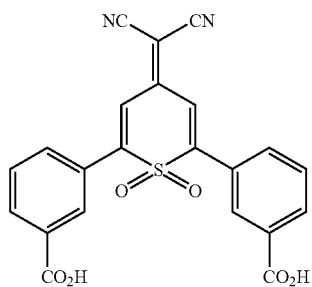
I-15
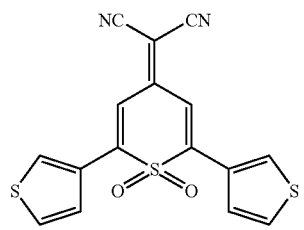
I-16
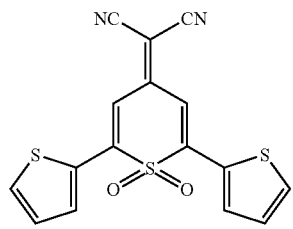
I-17
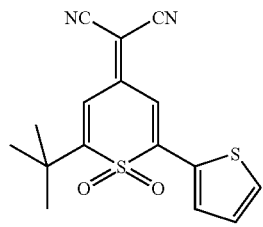
I-18
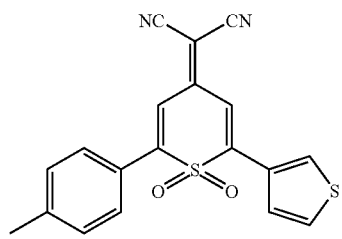

-continued
I-19
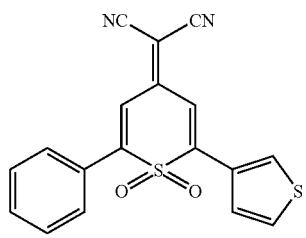
I-20
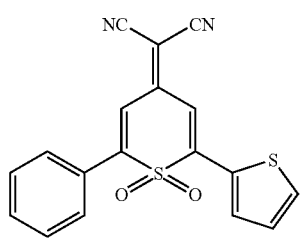
I-21
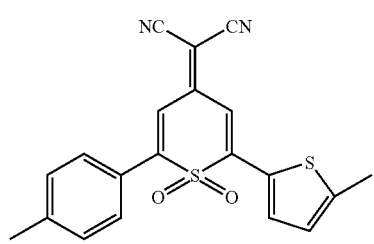
I-22
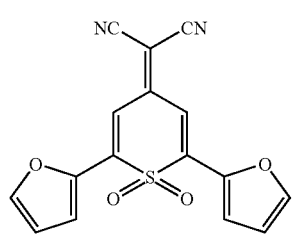
I-23
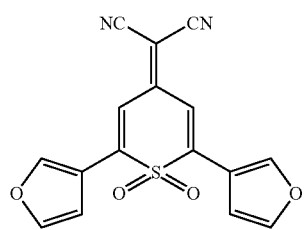
I-24
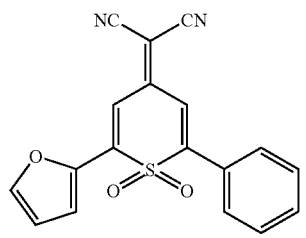

-continued
I-25
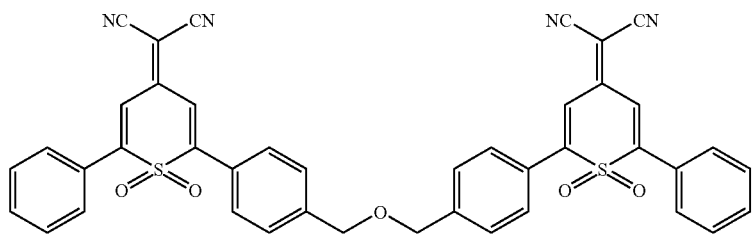
I-26
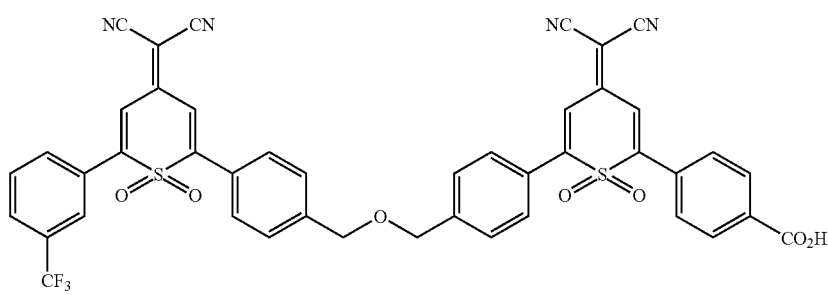
I-27
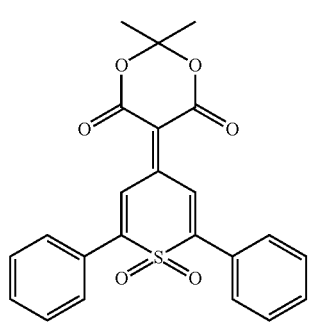
I-28
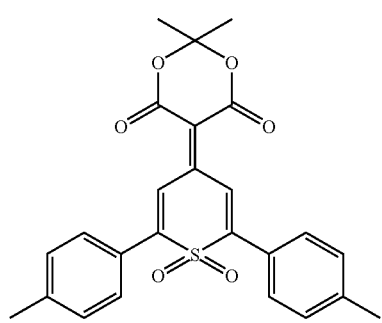
I-29
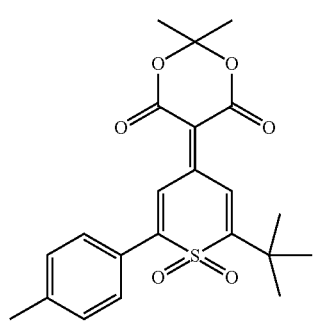

-continued
I-30
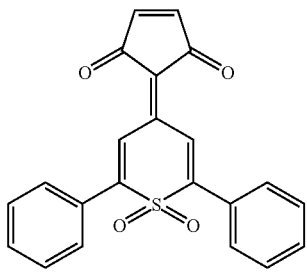
I-31
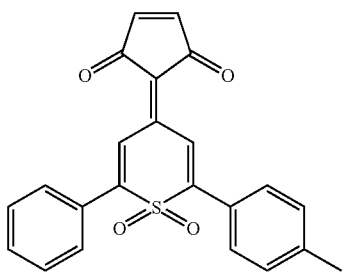
I-32
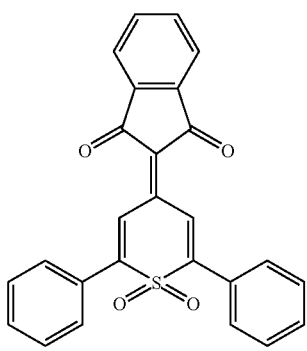
I-33
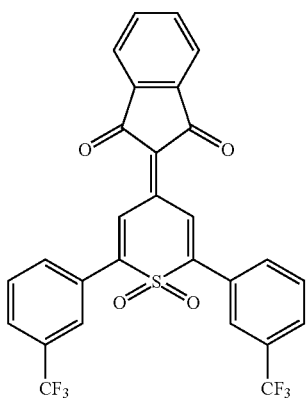

-continued
I-34
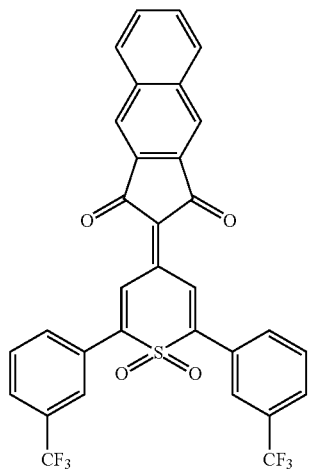
I-35
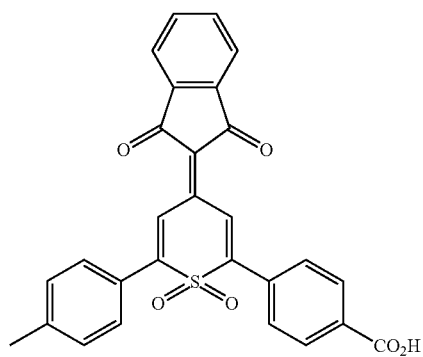
I-36
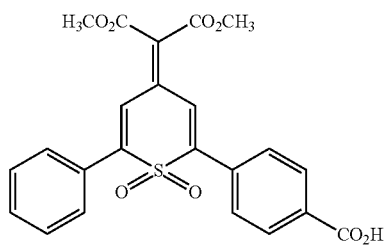
I-37
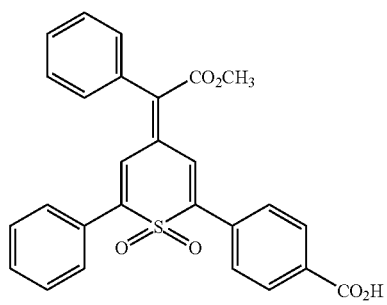

I-38
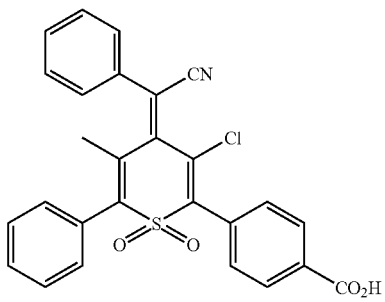
I-39
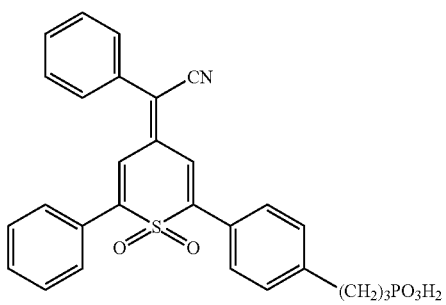
I-40
I-41
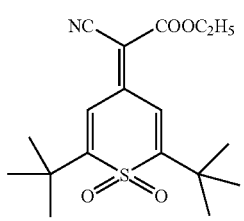
I-42
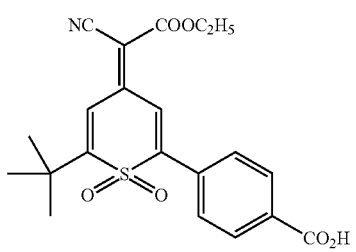

I-43
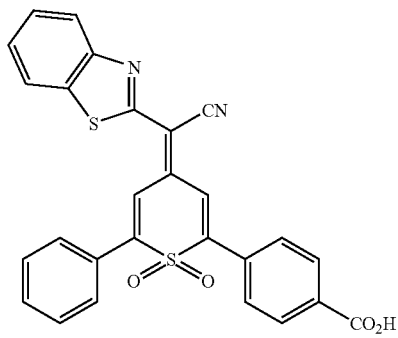
I-44
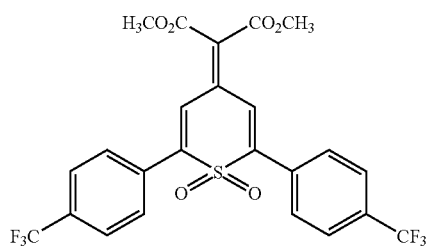
I-45
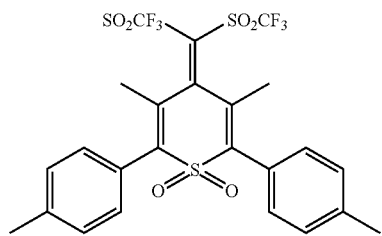
I-46
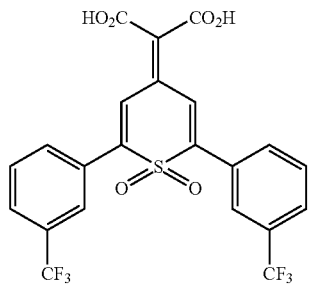
I-47
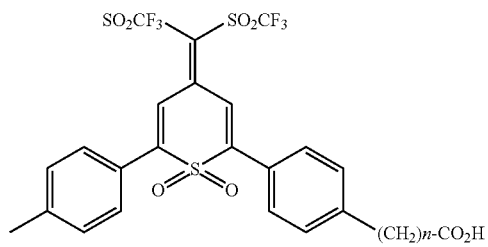

-continued
I-48
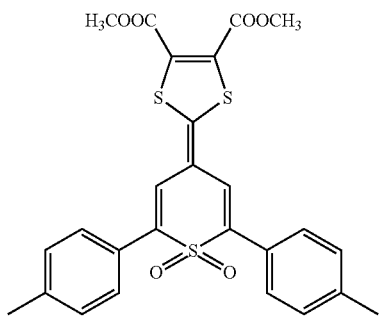
I-49
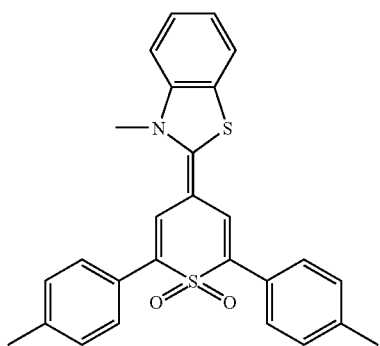
I-50
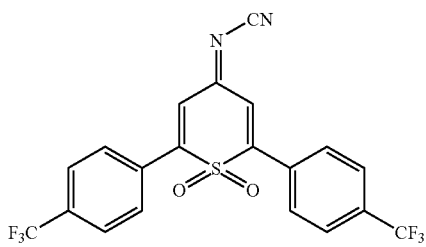
I-51
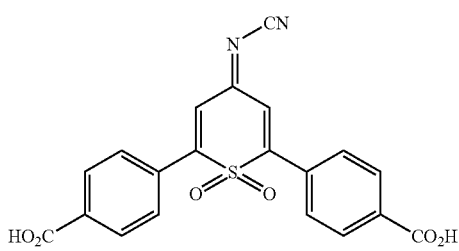
I-52
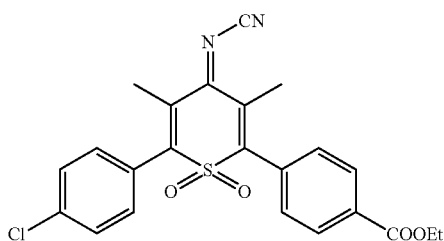
I-53
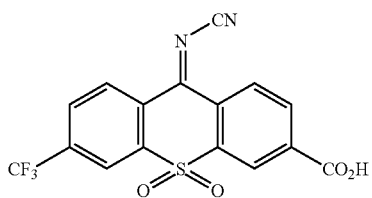

-continued
I-54
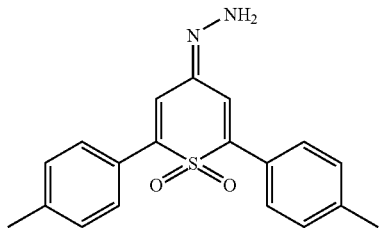
I-55
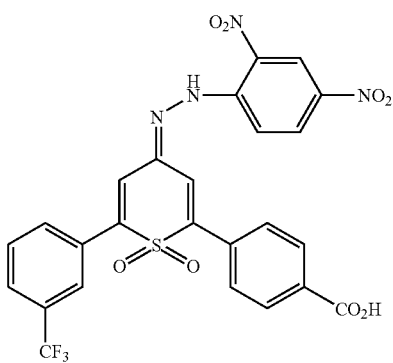
I-56
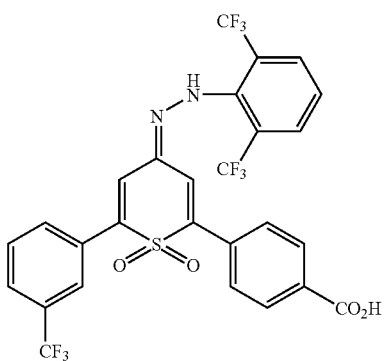
I-57
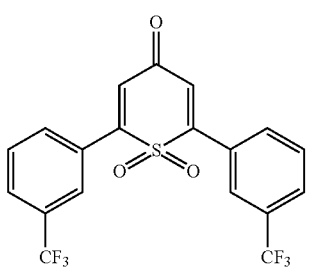
I-58
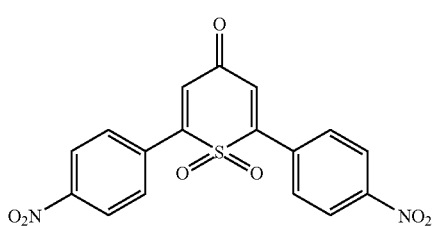

-continued
I-59
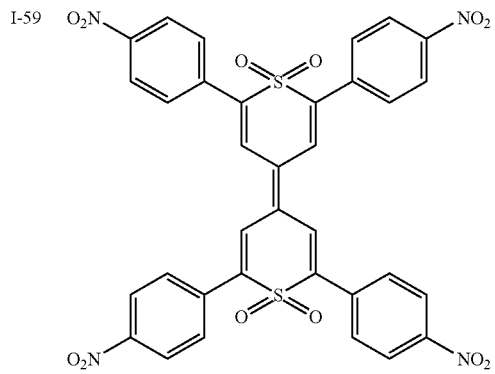
I-60
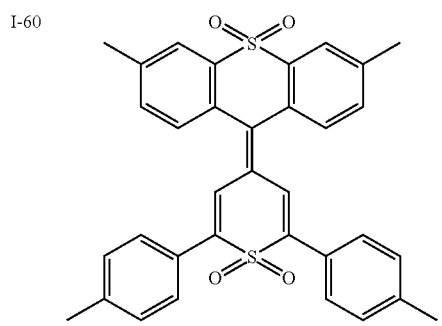
I-61
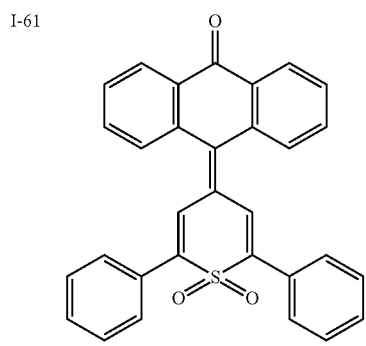
I-62
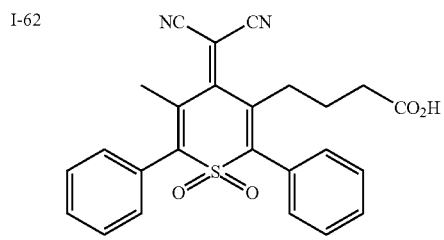
I-63
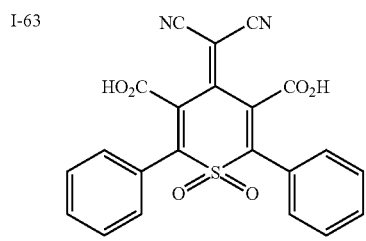

-continued
I-64
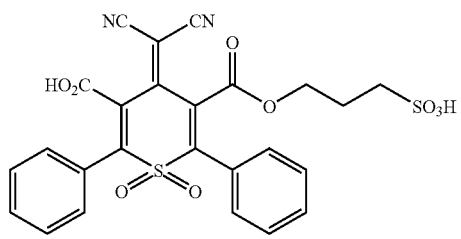
I-65
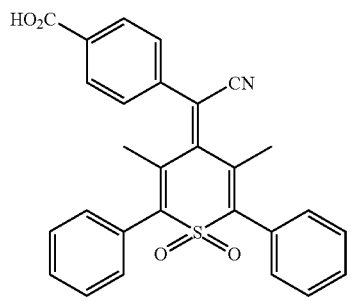
I-66
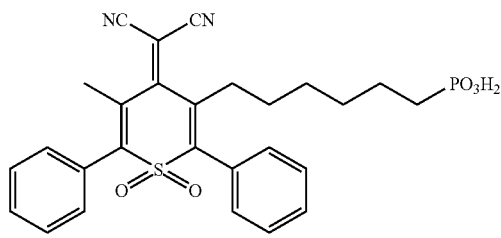
I-67
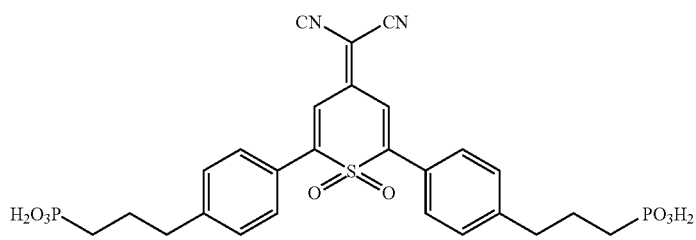
I-68
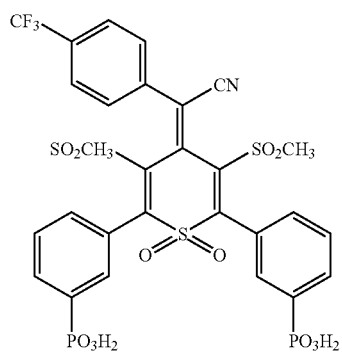

-continued

I-69
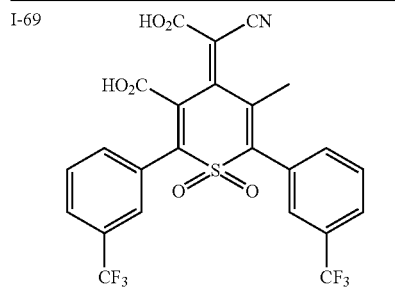

I-70
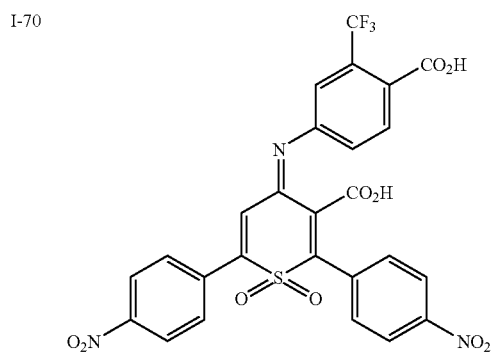

I-71
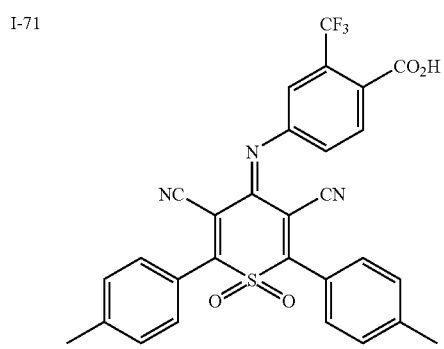

Preferred compounds listed above include I-1 thru I-6, I-8 thru I-13, I-15 thru I-25, I-27 thru I-35, I-40, I-41, I-46, I-48, I-49. Additionally, compounds I-7, I-14, I-26, I-36 thru I-38, I-42 thru I-44, I-47, I-62 thru I-65, I-69 are preferred. More preferred compounds include I-39, I-66, I-67, I-68, I-50 thru I-61, I-70, I-71. The most preferred electrochromophores of the present invention include I-2, I-6, and I-8. In one preferred embodiment, the electrochromic material comprises electrochromic sulfone structures that have groups for linking to nanocrystalline TiO2 or SnO2.

The molecular electrochromophores of this invention are characterized by their electrochemical reduction potentials. Certain thiopyran derivatives have been previously reported to have low electrochemical reduction potentials and form stable radicals as described in M. Detty, R. Eachus, J. Sinicropi, J. Lenhard, M. McMillan, A. Lanzafame, H. Luss, R. Young, J. Eilers, J. Org. Chem. 1995, 60, 1674. Preferably, the electrochromophre has an electrochemical reduction potentials of from −1.0 to +0.2 volts vs. saturated calomel electrode (SCE). More preferably, the electrochromophre has an electrochemical reduction potentials of from −0.8 to −0.1 volts vs SCE. Most preferably, the electrochromophore has an electrochemical reduction potentials of from −0.6 to −0.2 volts vs SCE.

The molecular electrochromic materials of this invention are also characterized by the color of the neutral state and of the radical ion generated by reduction, preferably one-electron reduction. The difference in color between the neutral and radical ion states is often referred to as the contrast change. A large contrast change is preferred. For some applications of these electrochromic sulfone materials, it may be advantageous for the neutral form of the sulfone to be colorless. A colorless neutral form for the electrochromic materials of general structure I is favored, when the substituents R 1 thru R 5 contain one or more electron withdrawing substituents. Accordingly, a colorless neutral state is obtained, for instance, in illustrative example I-6 that contains the dicyanomethylidene at R3 and wherein R1 and R5 substituents are trifluoromethylphenyl. A colorless neutral state is also favored when the substituents R1 and R5 are alky and X is carbon. Preferably the radical ion, generated by one-electron reduction, exhibits absorption in the visible spectral region with high extinction. It is also preferred that the color of the corresponding radical ion be tunable by synthetic modification of the material of general structure I. Color tunability in the electrochromophores of general structure I is achieved by variation of X and/or by variation in the substituents R1 thru R5. For instance, the radical cation color can be varied from purple to green by synthetic alteration of the R1 and R5 substituent from trifluorophenyl to nitrophenyl in illustrative examples I-6 to I-8. For three-color display applications, multiple electrochromic materials of general structure I, with various X and or various R1 thru R5, would be used to generate red, green, and blue, or alternatively, cyan, magenta, and yellow colors upon reduction.

The electrochromophores of the present invention also exhibit additional properties. The electrochromic materials is capable of color change upon reduction and the color change upon reduction is reversible. The electrochromic material is preferably stable in the reduced and unreduced states.

The invention provides an electrochromic device comprising a substrate, at least two electrodes, an electrolyte positioned between the electrodes, an electron donor, and an electrochromic material comprising a substituted-1,1-dioxothiopyran of the general structure I. In a preferred embodiment, the electrochromic device or system comprises a first electrode disposed on a transparent substrate; a second electrode; an electrolyte; an electron donor; and an electrochromic material comprising an electrochromic material of structure I.

The electrochromic material may be located anywhere in the device, provided it is able to demonstrate its electrochromic properties. In one embodiment, the electrochromic material is an insoluble film at least one of the electrodes. In another embodiment, the electrochromic material is chemically bonded to at least one of the electrodes. In another embodiment, the electrochromic material is chemisorbed to at least one of the electrodes. In another embodiment, the electrochromic material is located in the electrolyte.

The electrochromic material may be contained in an electrochromic layer. This layer may preferably comprise a sulfone electrochromophore present in solution, in gels or in a solid layer. Likewise the electrochromic layer may contain mixtures of various sulfone electrochromophores, or mixtures of a sulfone electrochromophore and other suitable electrochromophores. The mixing ratios can be varied within wide limits. The mixing ratios allow the optimization of a desired color shade or degree of blackness and/or the optimization of the desired dynamics when used in the electrochromic device.

Further possible additives for the electrochromic layer are UV absorbers. Examples are UVINOL® 3000 (2,4-dihydroxybenzophenone, BASF), Tinuvin® P, SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24® (2,2'-dihydroxy-4-methoxybenzophenone, American Cyanamid Company), UVINUL® 3035 (ethyl 2-cyano-3,3-diphenylacrylate, BASF), UVINUL® 3039 (2-ethylhexyl 2-cyano-3,3-diphenylacrylate, BASF), UVINUL® 3088 (2-ethylhexyl p-methoxycinnamate, BASF), CHIMASSORB® 90 (2-hydroxy-4-methoxybenzophenone, Ciba). Mixtures of UV absorbers may also be used. The UV absorbers are used in the range from 0.01 to 2 mol/l, preferably from 0.04 to 1 mol/l. Additional possible additives for the electrochromic layer are various redox stabilizers which controllably maintain the predetermined color of the electrochromic layer while in the high transmission (bleached or "off") state. Any suitable redox stabilizer may be used, for example those described in U.S. Pat. No. 6,433,914, and includes quinones, pyryllium and bipyryllium salts, substituted anthracenes, substituted alkoxybenzenes, and substituted polyhydroxybenzenes. It should be noted that some of the additional materials may also be appropriately added to the electrolyte layer, for example UV absorbers and redox stabilizers.

The substrate for the first electrode is preferably formed from any one of a number of materials that are substantially transparent in the visible region, such as glass of borosilicate or soda-lime, natural and synthetic polymeric resins, plastics, or composites, although the electrode layer may also be reflective or otherwise non-transparent. The first electrode that is disposed on the transparent support is an electrically conductive material that is also substantially transparent. It is contemplated that the transparent conducting material may be a layer of fluorine doped tin oxide (FTO), for example TEC glass from Pilkington, or indium tin oxide (ITO), doped zinc oxide, or other materials known in the art. This transparent conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO2$, $Zn2SriO4$, $Cd2SnO4$, $Zn2In205$, $MgIn204$, $Ga2O3$—$In2O3$, or $TaO3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin-oxide or indium-tin-oxide (ITO), or polythiophene. Typically, the conductive layer is sputtered onto the substrate to a resistance of less than 250 ohms per square. Indium tin oxide (ITO) is the preferred conductive material, as it is a cost effective conductor with good environmental stability, up to 90% transmission, and down to 20 ohms per square resistivity. An exemplary preferred ITO layer, considered for purposes herein as being transparent, has a % transmittance (% T) greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10-120 nm in thickness, or 50-100 nm thick to achieve a resistivity of 20-60 ohms/square on plastic. An exemplary preferred ITO layer is 60-80 nm thick. Alternatively, the conductive layer may be an opaque electrical conductor formed of metal such as copper, aluminum or nickel. If the conductive layer is an opaque metal, the metal can be a metal oxide to create a light absorbing conductive layer. The conductor may also be patterned. In a preferred embodiment, the first electrode functions as the cathode.

The second electrode may or may not also be transparent, or may be reflecting for example if the electrochromic device is to be a mirror. As such the second electrode may be a transparent or non-transparent conducting oxide, or a metal or combination of metals. The substrate for the second electrode may be the same as that for the first electrode, or depending on the type of electrochromic device, need not be transparent. As such, the substrate for the second electrode may comprise glass, polymers, metals, and ceramics, to name a few. In a preferred embodiment, the second electrode functions as the anode.

The electrolyte may be a liquid or gel form and preferably comprises suitable solvent and at least one electrochemically inert salt. Suitable inert conductive salts are lithium, sodium and tetraalkylammonium salts or molten salts. The alkyl groups of the tetraalkylammonium salts may have from 1 to 18 carbon atoms and be identical or different. Anions which are suitable for these salts include tetrafluoroborate, tetraphenylborate, cyanotriphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate, hexafluorosilicate, 7,8- or 7,9-dicarbanido-undecaborate. Examples of other suitable salts include hexafluorophosphate, bis-trifluoromethanesulfonate, bis-trifluoromethylsulfonylamide, tetraalkylammonium, dialkyl-1,3-imidazolium and lithium perchlorate. Examples of suitable molten salts include trifluoromethanesulfonate, 1-ethyl,3-methyl imidazolium bis-trifluoromethylsulfonylamide and 1-propyl-dimethyl imidazolium bis-trifluoromethylsulfonylamide. The conductive salts are preferably used in the range from 0 to 1 mol/l.

The solvent may be any suitable solvent, provided that the solvent is transparent and the electrochemically inert salt is soluble in it. Additionally, the solvent may have a boiling point above room temperature and a dielectric constant higher than the dielectric constant of hexane. Preferably, the solvent has a dielectric constant between 10 and 50. The solvent may also be non-corrosive and non-toxic. Suitable solvents may include acetonitrile, butyronitrile, glutaronitrile, dimethylsulfoxide, dimethylformamide, dimethylacetamide, N-methyloxazolidinone, dimethyl-tetrahydropyrimidinone, 3,3'-oxydipropionitrile, hydroxypropionitrile, dimethylformamide, N-methylpyrrolidone, sulpholane, 3-methylsulpholane, y-butyrolactone and mixtures thereof.

The solvent may also be thickened to form a gel, for example, by means of polyelectrolytes, porous solids or nanosize particles having a large active surface area. Other polymeric additives may be included to control viscosity of the electroactive solution. This can be important for avoiding segregation, that is the formation of streaky or spotty color on prolonged operation of the electrochromic device in the switched-on state, and to control the decoloration rate after switching off the power. Suitable thickeners are all compounds customary for this purpose, for example polyacrylate, polymethacrylate (Luctite L®), polycarbonate or polyurethane.

The electron donor may any organic, inorganic, or organometallic electroactive material that is oxidized reversibly. The electron donor may be soluble in the electrolyte solvent, present as an insoluble film on the second electrode, or chemisorbed to a nanocrystalline semiconducting film that is adhered to the second electrode. It is preferred that the electron donor be colorless. The electron donors themselves may or may not under a color change upon oxidation at the second electrode. In one embodiment, the electron donor may comprise an electrochromic material that changes color upon oxidation. The preferred color change is from colorless to colored and is reversible. Preferred electron donors include phenothiazines, triarylamines, azines, substituted phenylendiamines, and metallocenes. Most preferred electron donors are N-ethylphenothiazine, 5,10-dihydro-dimethylphenazine, N,N-tetramethylphenylenediamine, tri-p-tolylamine, and ferrocene. The individual concentration of sulfone and electron donor in the electrochromic layer is at least $10^{-4}$ mol/l, preferably from 0.001 to 0.5 mol/l.

The invention also provides an electrochromic device or system comprising: a first electrode disposed on a transparent substrate; a second electrode; an electrolyte; an electron donor; one or more nanoporous-nanocrystalline semiconducting films that are intermediate, or adhered to, the first and second electrode, and one or more sulfone electrochromophores of structure I that are chemisorbed to at least one of the intermediate nanoporous-nanocrystalline semiconducting films.

In one preferred embodiment, the nanoporous-nanocrystalline semiconducting films is reflective. In one embodiment of the invention, a nanoporous-nanocrystalline semiconducting film is adhered to the first electrode. In another embodiment nanoporous-nanocrystalline semiconducting films are adhered to both the first electrode and second electrodes. In another aspect of the invention in addition to the first and second electrodes which may have adhered nanoporous-nanocrystalline semiconducting film, a separate nanoporous-nanocrystalline semiconducting film may be used as a reflective layer between the two electrodes.

The nanocrystalline semiconducting film may be an oxide of any suitable metal, such as, for example, titanium, zirconium, hafnium, chromium, molybdenum, tungsten, vanadium, niobium, tantalum, silver, zinc, strontium, iron ($Fe^{2+}$ or $Fe^{3+}$) or nickel or a mixed metal oxide, also referred to as a perovskite, thereof. $TiO_2$, $WO_3$, $MoO_3$, $ZnO$, $SnO_2$ and $SnO_2$ doped with Sb are particularly preferred. The nanocrystalline semiconducting film may be deposited as an insoluble film on one or both electrodes of the device, and when deposited on two electrodes within a device these nanocrystalline semiconducting films may be the same or different.

EXAMPLES

The following examples are provided to illustrate the invention.

Electrochemical reduction potentials were measure by the method of cyclic voltammetry as described in *Electrochemical Methods*, A. Bard and L. Faulkner, editors, Wiley, New York (1980) p213-248. In this technique, the electrochromophore is dissolved at a concentration of approximately $5 \times 10^{-4}$ M in a solution of acetonitrile that contained 0.1 M tetrabutylammonium tetrafluoroborate electrolyte. Oxygen was removed from the solution by bubbling nitrogen through the solution for approximately 5 minutes. A two-compartment, three-electrode voltammetry cell was utilized wherein the contact between the reference electrode and working electrode compartments was made with a luggin probe. Working electrodes were of Platinum or Gold in a disk form (1.6 mm diameter) and were polished with 1-μm diamond paste, rinsed with water, and dried before each experiment. All potentials were measured vs the NaCl-saturated calomel electrode (SCE) at 22 C. Measurement was conducted using a potential sweep rate of 0.1 V per second or 0.2 V per second. The reduction potential was taken as the average of the anodic and cathodic peak potentials of the cyclic voltammogram. Reduction potential values Er relative to SCE for typical thiopyran electrochromophores of this invention are listed in Table A.

TABLE A

| Reduction Potentials | |
|---|---|
| Compound | Er (V vs SCE) |
| I-1 | −0.20 |
| I-9 | −0.39 |
| I-10 | −0.29 |
| I-20 | −0.19 |
| I-16 | −0.17 |
| I-15 | −0.23 |

TABLE A-continued

Reduction Potentials

| Compound | Er (V vs SCE) |
|---|---|
| I-22 | −0.18 |
| I-13 | −0.40 |
| I-12 | −0.28 |
| I-17 | −0.21 |
| I-19 | −0.22 |
| I-24 | −0.19 |
| I-11 | −0.29 |
| I-2 | −0.22 |
| I-6 | −0.16 |
| I-8 | −0.48 |
| I-30 | −0.27 |
| I-27 | −0.23 |
| I-41 | −0.57 |

The spectral changes that accompany the one-electron electrochemical reduction of the various thiopyran electrochromophores to their corresponding radical anions were measure by the spectroelectrochemical technique. In this technique, the thiopyran is dissolved at a concentration of between $5\times10^{-4}$ M to $1\times10^{-6}$ M in a solution of acetonitrile that contained 0.1 M tetrabutylammonium tetrafluoroborate electrolyte. The solution is place in the center compartment of a 50 mL-three-compartment coulometric cell system equipped with a 67 $cm^2$ area Pt gauze working electrode, a mechanical stirrer, a counter electrode compartment containing a second Pt electrode, and a reference electrode compartment containing an SCE reference electrode. The counter electrode and reference electrode compartments are separated from the main electrolysis compartment using porous glass frits. Oxygen was removed from the solution by bubbling nitrogen through the solution for approximately 10 minutes. Exhaustive one-electron reduction of the thiopyran electrochromophore was achieved by controlled-potential coulometry wherein the working electrode was poised at a potential 200 mV negative of the reversible reduction potential Er of the dye. The electrolyzed solutions were rapidly pumped through 0.8 mm inner-diameter Teflon tubing to a 1 mm or 10 mm path length quartz spectral flow-cell for measurement of the absorption spectrum of the anion radical. Absorption spectra (optical density vs wavelength) were recorded using a diode array spectrophotometer. The stability of the colored state was determined by monitoring the absorption spectrum of the radical anion as a function of time. Optical extinction and absorption maxima data are listed in Table B.

TABLE B

Spectral data for 2,6-disubstituted-4H-1,1-dioxo-thiopyran electrochromophores in acetonitrile solution

| | Neutral form | | | Anion radical form | |
|---|---|---|---|---|---|
| Cpd | $\lambda_{max}$ (nm) | color | extinction ($M^{-1} cm^{-1}$) | $\lambda_{max}$ (nm) | color | extinction ($M^{-1} cm^{-1}$) |
| I-1 | 371 | yellow | 28,000 | 556 | purple | 18,000 |
| I-9 | 319 | colorless | 27,000 | 550 | magenta | 9,800 |
| I-10 | 333 | yellow | 27,000 | 528 | purple | 19,000 |
| I-2 | 380 | yellow | 21,000 | 553 | purple | 12,400 |
| I-6 | 347 | colorless | 26,200 | 558 | purple | 15,400 |
| I-8 | 265 | yellow | — | 712,490 | green | — |
| I-30 | 391 | yellow | 27,000 | 446,582 | green | 19,600 |
| I-27 | 360 | yellow | 18,100 | 556 | purple | 9,700 |
| I-41 | 316 | colorless | — | 546 | magenta | — |

The data of Table B indicate that a colorless neutral state is favored for 2,6-disubstituted-4H-1,1-dioxo-4-(dicyanomethylidene)thiopyran electrochromophores wherein the 2 and 6 substituents are alkyl substituents or aromatic substituents that bear one or more electron withdrawing substituents.

Example 1

Synthesis of Indanedione and Dicyanomethylidine Derivatives of Sulfones

Synthetic routes for the preparation of the intermediate 4H-thiopyran-4-one 1,1-dioxides with a variety of substituents at the 2- and 6-positions have been described in N. Rule, M. Detty, J. Kaeding, J. Sinicroopi, J. Org. Chem. 1995, 60, 1665, incorporated herein by reference. The thiopyran-4-one intermediates are easily converted into corresponding indanedione derivative by base catalyzed condensation with 1,3-indanedione in ethanol, as disclosed in U.S. Pat. No. 4,514,481 (page 3, line 60). Similarly, condensation of thiopyran-4-one 1,1-dioxides with malononitrile readily affords dicyanomethylidine derivatives, as disclosed in U.S. Pat. No. 4,514,481 (page 3, line 35).

Example 2

Electrochromism of 2,6-di-(3-trifluorophenyl)-4H-1,1'-dioxo-4-(dicyanomethylidene)thiopyran (I-6) in acetonitrile The electrochromic properties of 2,6-di-(3-trifluorophenyl)-4H-1,1-dioxo-4-(dicyanomethylidene)thiopyran, structurally represented by I-6 above, were determined in acetonitrile solution. The electrochemical reduction potential was measured by cyclic voltammetry to be −16 V vs SCE and gave colorless solutions, that is, solutions exhibiting no absorption in the visible region, when dissolved in a nonaqueous solvent such as acetonitrile. Controlled potential reduction at an applied potential of −0.5 V produced the intensely colored anion radical that exhibited spectral absorption across a broad region of the visible spectrum as indicated by the absorption spectrum of FIG. 1. The thiopyran radical anion had a very high optical absorption coefficient, measured to be 15,400 $M^{-1} cm^{-1}$, and thus produced a very high contrast change due to the electrochromic effect. The visibly colored anion radical was very stable, showing only minor changes in absorption spectrum over a 24 hr time span. The electrochemically induced spectral changes were completely reversible. Reapplication of a potential of 0 V to the Pt working electrode quantitatively regenerated the spectrum of the neutral thiopyran I-6 and again yielded a colorless solution. The reduction/oxidation cycle could be repeated many times without noticeable loss of optical signal.

These data demonstrate that 2,6-di-(3-trifluorophenyl)-4H-1,1-dioxo-4-(dicyanomethylidene)thiopyran I-6 is an electrochromophore with properties that are much preferred for use in electrochromic applications. The thiopyran electrochromophore is a colorless molecular material with a low reduction potential, that provides intensely colored state on reduction, gives a high contrast electrochromic effect, is bistable, and thus may be cycled from the colorless to the colored state many times.

Example 3

Figure 2:
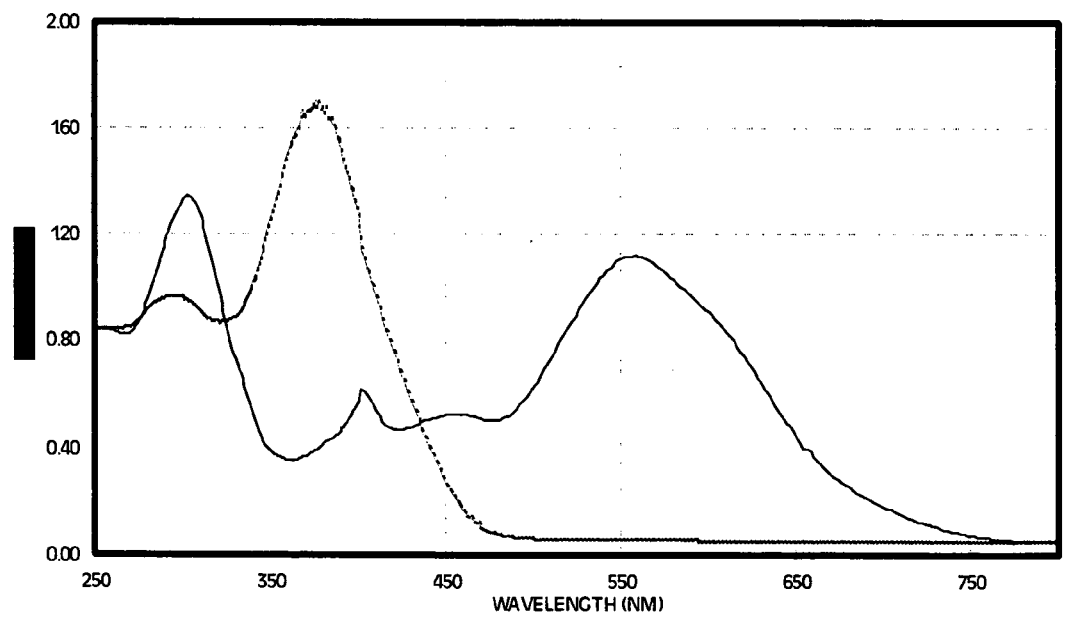
FIG. 2 illustrates the spectra of electrolyte solution 2-phenyl, 6-tolyl-4H-1,1-dioxo-4-(dicyanomethylidene)thiopyran (I-2) with applied potential of 0 V (dashed curve), −0.3 V (solid curve), and again at 0 V (dotted curve).

Electrochromism of 2-phenyl 6-tolyl-4H-1,1-dioxo-4-(dicyanomethylidene)thiopyran (I-2) in acetonitrile The electrochromic properties of 2-phenyl, 6-tolyl-4H-1,1-dioxo-4-(dicyanomethylidene)thiopyran, structurally represented above as I-2, were determined in acetonitrile solution. The electrochemical reduction potential of I-2 was measured by cyclic voltammetry to be −0.22 V vs SCE and gave pale yellow solutions when dissolved in a nonaqueous solvent such as acetonitrile. Controlled potential reduction at an applied potential of −0.5 V produced the intensely colored anion radical that exhibited spectral absorption across a broad region of the visible spectrum as indicated by the absorption spectrum of FIG. 2. The thiopyran radical anion had a very high optical absorption coefficient, measured to be 12,400 $M^{-1}cm^{-1}$, and thus produced a very high contrast change due to the electrochromic effect. The visibly colored anion radical was very stable, showing only minor changes in absorption spectrum over a 24 hr time span. The electrochemically induced spectral changes were completely reversible. Reapplication of a potential of 0 V to the Pt working electrode quantitatively regenerated the spectrum of the neutral thiopyran I-2 and again yielded the pale yellow solution. The reduction/oxidation cycle could be repeated many times without noticeable loss of optical signal.

Example 4

Figure 3:
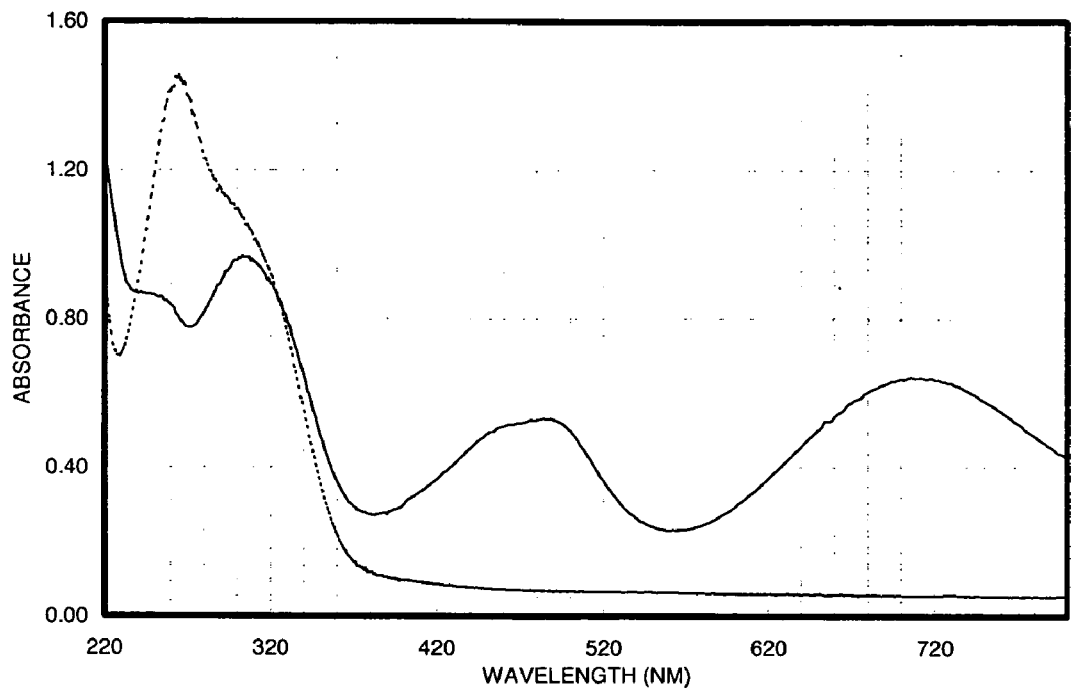
FIG. 3 illustrates a spectra of acetonitrile electrolyte solution containing 2,6-di-(4-nitrrophenyl)-4H-1,1-dioxo-4-di-cyanomethylidene)thiopyran (I-8) with applied potential of 0 V (dashed curve), −0.7 V (solid curve).

Electrochromism of 2,6-di-(4-nitrophenyl)-4H-1,1-dioxo-4-(dicyanomethylidene)thiopyran (I-8) in acetonitrile The electrochromic properties of 2,6-di-(4-nitrrophenyl)-4H-1,1-dioxo-4-(dicyanomethylidene)thiopyran, structurally represented above as I-8, were determined in acetonitrile solution. The electrochemical reduction potential of 16 was measured by cyclic voltammetry to be −0.48 V vs SCE and gave colorless solutions when dissolved in a nonaqueous solvent such as acetonitrile. Controlled potential reduction at an applied potential of −0.7 V produced the green colored anion radical that exhibited two absorption bands at 706 nm and 490 nm in the visible spectrum as indicated by the absorption spectrum of FIG. 3. The thiopyran radical anion had a very high optical absorption coefficient and thus produced a very high contrast change due to the electrochromic effect. Reapplication of a potential of 0 V to the Pt working electrode regenerated the spectrum of the neutral thiopyran I-8 and again yielded the colorless solution.

Example 5

Electrochromic device comprising 4H-1,1-dioxo-2,-phenyl-6-tolyl-4-(dicyanomethylidene)thiopyran An electrochromic devices was fabricated by filling a thin cavity between two transparent conducting oxide (TCO) substrates with an electrolyte solution containing the sulfone 4H-1,1-dioxo-2,-phenyl-6-tolyl-4-(dicyanomethylidene)thiopyran I-2. The electrolyte solution was prepared from reagent grade acetonitrile and contained 0.1 M lithium perchlorate. Added to the electrolyte were 30 mM I-2 and 30 mM of N-ethylphenothiazine. N-ethylphenothiazine served as the redox chromophore (that is, electron donor) that undergoes oxidation at the anode, which is complimentary to the reduction reaction of I-2 that occurs at the cathode of the device. The transparent conducting oxide substrates were fluorine-doped SnO2 on glass slides (TEC 8/3 Pilkington) and served as the cathode and the anode while the solution served as the electrochromic layer.

Figure 4:
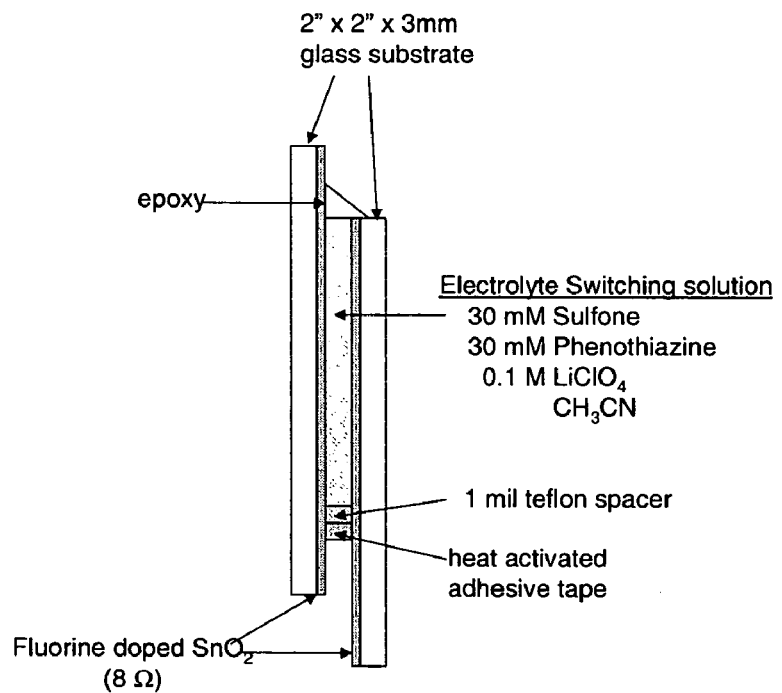
FIG. 4 illustrates am embodiment of an electrochromic device according to the present invention.

The electrochromic device was formed by first placing a U-shaped spacer constructed from 1 mil Teflon film on the conductive side of one TCO plate. A similar "U" shaped gasket was cut from a thermoplastic sealant to a dimension that surrounded the Teflon spacer. The second TCO plate was placed conductive side down on top of the construction with the two TCO plate offset by ¼ inch to provide surfaces for electrical connections. The pair of TCO plates were clamped together and heated at 150° C. for about 5 minutes to create a permanent seal. After cooling, the bonded pair of TCO plates were transferred into an enclosed environment that was filled with nitrogen gas. The electrolyte/electrochromophore solution was purged with nitrogen for 10 minutes, and the dearated electrolyte/electrochromophore solution was pipetted into the (ca. 1 mil wide) cavity between the TCO plate. Once filled, the top of the U-shaped cavity was sealed by applying stripe of epoxy sealant (ChemGrip) across the opening. The resultant electrochromically active area was 2×2.5 cm. A diagram of device is shown in FIG. 4.

Figure 5:
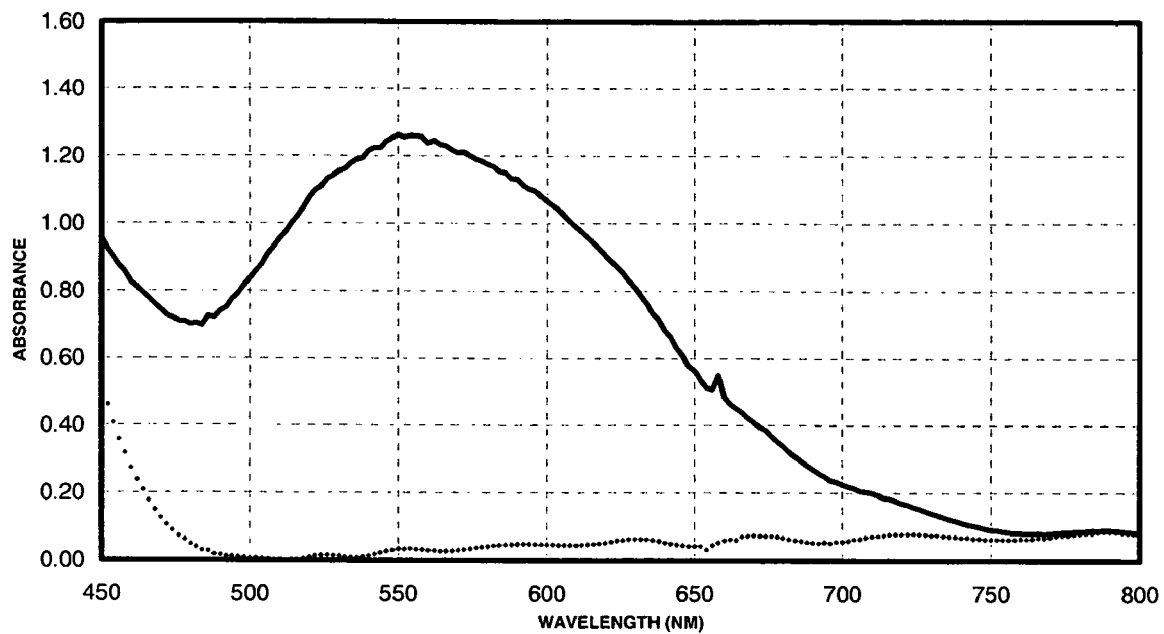
FIG. 5 illustrates an absorption spectra recorded for an electrochromic device according to the present invention before (dotted curve) and after (solid curve) application of a DC voltage of 3V.

Connections to the anode and cathode were made by attaching wire leads to each glass plate with alligator clips. DC voltages were applied via a PAR Model 173 Potentiostat/Galvanostat. The electrochromic behavior of the devices were characterized by monitoring the spectral response of the device as it was switched on (by applying a DC voltage), then switched off (reversed) by applying 0 volts. The spectra were obtained by placing the electrochromic device in the lightpath of an HP8450A Diode array Spectrophotometer. The spectra were corrected for the baseline absorption of a similar device containing no sulfone I-2 or phenothiazine in the electrolyte. The spectra shown in FIG. 5 show a high contrast electrochromic effect upon switching the potential applied to the device from 0 V to 3 V whereupon the color of the device changed from pale yellow to dark brown/black. Reapplication of 0V to the device quantitatively returned the pale original color. This process was repeated numerous times.

The results of this experiment demonstrate that sulfones such as 4H-1,1-dioxo-2,-phenyl-6-tolyl-4-(dicyanomethylidene)thiopyran are excellent molecular electrochromic materials. An electrochromic device as shown here that contains the sulfone I-2 and a phenothiazine as the electrochromophores has a high "on/off" contrast ratio, is switchable with low applied voltages, is rapidly (seconds) switched from the on to off state, and is reversible over many cycles.

Example 6

Figure 6:
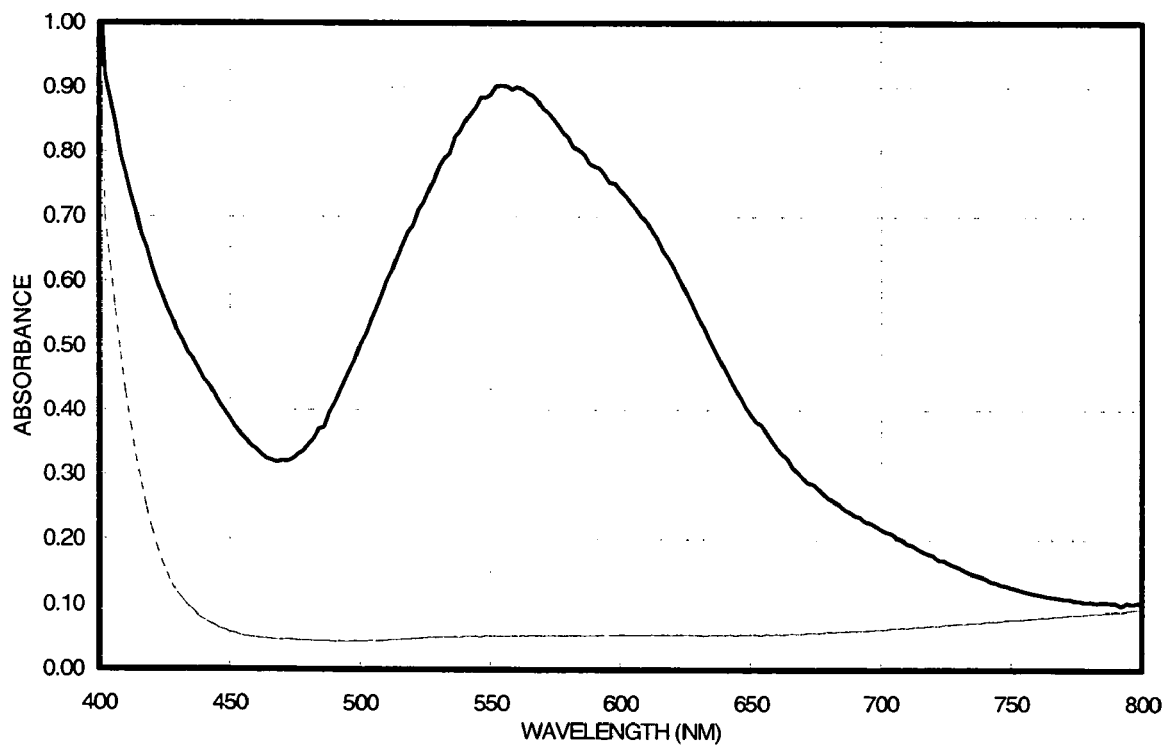
FIG. 6 illustrates an absorption spectra recorded for an electrochromic device according to the present invention before (dotted curve) and after (solid curve) application of a DC voltage of 1.5 V.

Electrochromic device comprising 2,6-di-(3-trifluorophenyl)-4H-1,1-dioxo-4-(dicyanomethylidene)thiopyran An electrochromic device was prepared and tested as described in Example 5 except that a double thickness of Teflon spacer was interposed between the TCO glass plates and the sulfone compound was 2,6-di-(3-trifluorophenyl)-4H-1,1-dioxo-4-(dicyanomethylidene)thiopyran I-6. Absorption spectra recorded for the electrochromic device before and after application of a DC voltage of 1.5 V are shown in FIG. 6. The results indicate a high contrast electrochromic effect upon the application of a modest DC potential whereupon the color of the device changed from a colorless, transparent to a dark purple color. Reapplication of 0V to the device quantitatively returned the device to the colorless, transparent state. This process was repeated numerous times by periodic application of 0 for 10 seconds and 1.5 V for 10 seconds with lonely minor changes in recorded spectrum after several hours.

The invention has been described in detail with particular reference to certain preferred embodiments thereof, but it will be understood that variations and modifications can be effected within the spirit and scope of the invention.

The invention claimed is:

1. An electrochromic material comprising a substituted-1,1-dioxo-thiopyran of the general structure I:

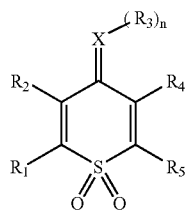

wherein:
X is carbon, nitrogen, oxygen, or sulfur;
n is 0, 1 or 2;
$R_3$ is independently an electron withdrawing group or a substituted or unsubstituted alky or aryl group;
$R_3$ and $R_5$ each independently represent a substituted or unsubstituted alkyl group, a substituted or unsubstituted aryl group, or a substituted or unsubstituted heterocyclic group; and
$R_2$ and $R_4$ each independently represent hydrogen, or an electron withdrawing group, or a substituted or unsubstituted alkyl group,
provided at least one of $R_1$ through $R_5$ comprises a carboxlate, saliclate, or phosphonate.

2. The electrochromic material of claim 1 wherein X represents carbon and the value of n is 2.

3. The electrochomic material of claim 2 wherein $R_3$ is halogen, cyano, COOH, $CO_2CH_3$, $CO_2$-alky, $CON(C_2H_5)_2$, $SO_2CH_3$, $SO_2$-aryl $SO_2CF_3$, $PO_3H_2$, $SO_3H$, $B(OH)_2$, or $SO_2N(C_2H_5)_2$].

4. The electrochromic material of claim 2 wherein $R_3$ is halogen, cyano, COOH, $CO_2CH_3$, $CO_2$-alky, $CON(C_2H_5)_2$, $SO_2CH_3$, $SO_2$-aryl $SO_2CF_3$, $PO_3H_2$, $SO_3H$, $B(OH)_2$, or $SO_2N(C_2H_5)_2$].

5. An electrochromic device comprising a substrate, at least two electrodes, an electrolyte positioned between said electrodes, an electron donor, and an electrochromic material comprising a substituted-1,1-dioxo-thiopyran of the general structure I:

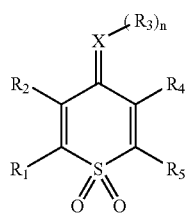

wherein:
X is carbon, nitrogen, oxygen, or sulfur;
n is 0, 1 or 2;

$R_3$ is independently an electron withdrawing group or a substituted or unsubstituted alky or aryl group;
$R_1$ and $R_5$ each independently represent a substituted or unsubstituted alkyl group, a substituted or unsubstituted aryl group, or a substituted or unsubstituted heterocyclic group; and
$R_2$ and $R_4$ each independently represent hydrogen, or an electron withdrawing group, or a substituted or unsubstituted alkyl group,
provided at least one of $R_1$ and $R_5$ comprises a carboxylate, salicylate, or phosphonate.

6. The electrochromic device of claim 5 wherein said electrolyte comprises at least one solvent and at least one electrochemically inert salt.

7. The electrochromic device of claim 6 wherein said salt is lithium, sodium and tetraalkylammonium salts or molten salts.

8. The electrochromic device of claim 6 wherein said solvent is transparent and said electrochemically inert salt is soluble therein.

9. The electrochromic device of claim 6 wherein said solvent has a dielectric constant between 10 and 50.

10. The electrochromic device of claim 6 wherein said solvent is selected from the group consisting of acetonitrile, butyronitrile, glutaronitrile, dimethylsulfoxide, dimethyl formamide, dimethylacetamide, N-methyloxazolidinone, dimethyl-tetrahydropyrimidinone, 3,3'-oxydipropionitrile, hydroxypropionitrile, dimethylformamide, N-methylpyrrolidone, sulpholane, 3-methylsulpholane, y-butyrolactone and mixtures thereof.

11. The electrochromic device of claim 6 wherein said solvent is acetonitrile, butyronitrile, or γ-butyrolactone.

12. The electrochromic device of claim 6 wherein said electrolyte is in liquid or gel form.

13. The electrochromic device of claim 12 wherein said gel is formed by means of polyelectrolytes, porous solids or nanosize particles.

14. The electrochromic device of claim 12 wherein said gel is formed by means of thickeners selected from the group consisting of polyacrylate, polymethacrylate, polycarbonate or polyurethane.

15. The electrochromic device of claim 5 wherein said electrolyte further comprises at least one UV absorber.

16. The electrochromic device of claim 5 wherein said electrolyte further comprises at least one redox stabilizer.

17. The electrochromic device of claim 5 wherein said electron donor is an organic, inorganic, or organometallic electroactive material that is oxidized reversibly.

18. The electrochromic device of claim 5 wherein said electron donor is at least one member selected from the group consisting of phenothiazines, triarylamines, azines, phenylendiamines, and metallocenes.

19. The electrochromic device of claim 5 wherein said electron donor is a N-substituted phenothiazine, a triarylamines, or a metallocene.

20. The electrochromic device of claim 5 wherein said electron donor is at least one member selected from the group consisting of N-ethylphenothiazine, 5,10-dibydro-dimethylphenazine, N,N-tetramethyiphenylenediamine, tri-p-tolylamine, and ferrocene.

21. The electrochromic device of claim 5 wherein said electron donor is located in said electrolyte.

22. The electrochromic device of claim 5 wherein said electron donor is present in at least one of said first electrode or said second electrode.

23. The electrochromic device of claim 5 wherein said electrochromic material and said electron donor are present in said electrochromic layer in the concentration of at least $10^{-4}$ mol/l.

24. The electrochromic device of claim 5 wherein said electrochromic material and said electron donor are present in said electrochromic layer in the concentration of from 0.001 to 0.5 mol/l.

25. The electrochromic device of claim 5 wherein said electron donor is a Prussian blue material.

26. The electrochromic device of claim 5 wherein said electron donor is a polymeric material.

27. The electrochromic device of claim 5 wherein said electron donor is a metal oxide material.

28. The electrochromic device of claim 5 wherein said electron donor is a metal.

29. The electrochromic device of claim 5 further comprising at least one chromophore demonstrating a color change upon oxidation.

30. The electrochromic device of claim 5 wherein said electrochromic material is an insoluble film on said first electrode or said second electrode.

31. The electrochromic device of claim 5 wherein said electrochromic material is chemically bonded to said first electrode or said second electrode.

32. The electrochromic device of claim 5 wherein said electrochromic material is chemisorbed to said first electrode or said second electrode, 33. The electrochromic device of claim 5 wherein said electrochromic material is located in said electrolyte.

34. The electrochromic device of claim 5 wherein said electrochromic material is located in an electrochromic layer.

35. The electrochromic device of claim 34 wherein said electrochromic material is electrochromic layer is in the form of a solution, gel, or solid layer.

36. The electrochromic device of claim 34 wherein said electrochromic layer is a polymer or polymer composite.

37. The electrochromic device of claim 34 wherein said electrochromic layer further comprises at least one UV absorber.

38. The electrochromic device of claim 34 wherein said electrochromic layer further comprises at least one redox stabilizer.

39. The electrochromic device of claim 38 wherein said at kast one redox stabilizer is selected from the group consisting of quinones, pyryllium and bipyryllium salts, substituted anthracenes, substituted alkoxybenzenes, and substituted polyhydroxybenzenes.

40. The electrochromic device of claim 38 wherein said at least one redox stabilizer is selected from the group consisting of quinones, substituted alkoxybenzenes, and substituted polyhydroxybenzenes.

41. The electrochromic device of claim 5 wherein said device is an electrochromic window, filter, minor, or display device.

42. The electrochromic material of claim 5 wherein X represents carbon and the value of n is 2.

43. The electrochromic material of claim 5 wherein X is oxygen or sulfur, and the value of n is 0.

44. The electrochromic material of claim 5 wherein said electrochromic material has an electrochemical reduction potential of from −1.0 to +0.2 Volts vs SCE.

45. The electrochromic material of claim 5 wherein said electrochromic material has an electrochemical reduction potential of from 0.8 to 0.1 Volts vs SCE.

46. The electrochromic material of claim 5 wherein said electrochromic material has an electrochemical reduction potential of from 0.6 to 0.2 Volts vs SCE.

47. The electrochromic material of claim 5 wherein said electrochromic material comprises electrochromic sulfone structures that have groups for linking to nanocrystalline $TiO_2$ or $SnO_2$.

48. The electrochromic material of claim 5 wherein said electrochromic material is capable of color change upon reduction.

49. The electrochromic material of claim 48 wherein said color change upon reduction is reversible.

50. The electrochromic material of claim 5 wherein said electrochromic material is stable in the reduced and unreduced states.

51. The electrochromic material of claim 5 wherein said electrochromic material is colorless and upon reduction is colored.

52. The electrochromic material of claim 5 which upon reduction exhibits optical absorption between 390 and 750 nm with an extinction coefficient between $5000\,M^{-1}\,cm^{-1}$ and $25{,}000\,M^{-1}cm^{-1}$.

53. The electrochromic device of claim 5 wherein said at least two electrodes comprise a first and second electrode, wherein said first electrode is disposed on said substrate, wherein said substrate is transparent, and where at least one of said first and second electrodes is transparent.

54. The electrochromic device of claim 53 wherein said first electrode is a cathode.

55. The electrochromic device of claim 53 wherein said first electrode is transparent.

56. The electrochromic device of claim 55 wherein said first electrode comprises ITO.

57. The electrochromic device of claim 55 wherein said first electrode comprises fluorine doped tin oxide (FTO), indium tin oxide (ITO), doped zinc oxide.

58. The electrochromic device of claim 57 wherein said first electrode further comprises other metal oxides of indium, titanium, cadmium, gallium-indium, niobium, tin, cerium oxide, zirconium, hafnium and tantalum.

59. The electrochromic device of claim 57 wherein said first electrode further comprises other metal oxides of indium, titanium, or tin.

60. The electrochromic device of claim 53 wherein said first electrode is reflective.

61. The electrochromic device of claim 53 wherein said second electrode comprises an anode.

62. The electrochromic device of claim 53 wherein said second electrode is transparent.

63. The electrochromic device of claim 62 wherein said second electrode comprises ITO.

64. The electrochromic device of claim 62 wherein said second electrode comprises fluorine doped tin oxide (FTO), indium tin oxide (ITO), doped zinc oxide.

65. The electrochromic device of claim 64 wherein said second electrode further comprises other metal oxides of indium, titanium, cadmium, gallium-indium, niobium, tin, cerium oxide, zirconium, hafnium and tantalum.

66. The electrochromic device of claim 64 wherein said second electrode further comprises metal oxides of indium, titanium, or tin.

67. The electrochromic device of claim 53 wherein said second electrode is reflective.

68. The electrochromic device of claim 53 further comprising at least one reflective nanoporous-nanocrystalline semiconducting film that is intermediate to said first electrode or said second electrode.

69. The electrochromic device of claim 68 wherein said electrochromophore is chemisorbed to said at least one of said nanoporous-nanocrystalline semiconducting films.

70. The electroobromic device of claim 68 wherein said nanocrystalline semiconducting film is a metal oxide.

71. The electrocliromic device of claim 70 wherein said metal oxide is any suitable metal selected from the group consisting of titanium, zirconium, hafnium, chromium, molybdenum, tungsten, vanadium, niobium, tantalum, silver, zinc, strontium, iron ($Fe^{2+}$ or $Fe^{3+}$) nickel or a mixed metal oxide thereof.

72. The electrochromic device of claim 70 wherein said metal oxide is any suitable metal selected from titanium, molybdenum, or tungsten.

73. The electrochromic device of claim 68 wherein said nanocrystalline semiconducting film is $TiO_2$, $WO_3$, $MoO_3$, ZnO, $SnO_2$ and $SnO_2$ doped with Sb.

74. The electrochromic device of claim 68 wherein said nanocrystalline semiconducting film is $TiO_2$, $SnO_2$ and $SnO_2$ doped with Sb.

75. The electrochromic device of claim 68 wherein said at least one nanocrystalline semiconducting film is independently deposited on said first electrode and said second electrode.

76. The electrochromic device of claim 5 wherein said electrochromic material is located in an electrochromic layer 77. The electrochromic device of claim 76 wherein said electrochromic material is electrochromic layer is in the form of a solution, gel, or solid layer.

78. The electrochromic device of claim 76 wherein said electrochromic layer is a polymer or polymer composite.

79. The electrochromic device of claim 76 wherein said electrochromic layer is an insoluble film on said first electrode or said second electrode.

80. The electrochromic device of claim 76 wherein said electrochromic layer is chemically bonded to said first electrode or said second electrode.

81. The electrochromic device of claim 76 wherein said electrochromic layer is chemisorbed to said first electrode or said second electrode.

* * * * *

UNITED STATES PATENT AND TRADEMARK OFFICE
CERTIFICATE OF CORRECTION

PATENT NO. : 7,471,437 B2
APPLICATION NO. : 10/813885
DATED : December 30, 2008
INVENTOR(S) : Jerome R. Lenhard et al.

It is certified that error appears in the above-identified patent and that said Letters Patent is hereby corrected as shown below:

| | |
|---|---|
| Column 43, Line 29 | Claim 1, delete "R3" and insert -- R1 --, therefor. |
| Column 43, Lines 36-37 | In Claim 1, delete "carboxlate," and insert -- carboxylate, --, therefor. |
| Column 43, Line 37 | In Claim 1, delete "saliclate," and insert -- salicylate, --, therefor. |
| Column 43, Line 40 | In Claim 3, delete "electrochomic" and insert -- electrochromic --, therefor. |
| Column 43, Line 43 | In Claim 3, delete "(C2H5)2]." and insert -- (C2H5)2. --, therefor. |
| Column 43, Line 47 | In Claim 4, delete "(C2H5)2]." and insert -- (C2H5)2. --, therefor. |
| Column 44, Line 10 | In Claim 5, delete "R1 and R5" and insert -- R1 through R5 --, therefor. |
| Column 44, Line 60 | In Claim 20, delete "dibydro" and insert -- dihydro --, therefor. |
| Column 44, Line 61 | In Claim 20, delete "tetramethyiphenylenediamine," and insert -- tetramethylphenylenediamine, --, therefor. |
| Column 45, Line 29 | In Claim 32, delete "electrode," and insert -- electrode. --, therefor. |
| Column 45, Line 46 | In Claim 39, delete "kast" and insert -- least --, therefor. |
| Column 45, Line 56 | In Claim 41, delete "minor," and insert -- mirror, --, therefor. |
| Column 45, Line 67 | In Claim 45, delete "0.8 to 0.1" and insert -- -0.8 to -0.1 --, therefor. |
| Column 46, Line 3 | In Claim 46, delete "0.6 to 0.2" and insert -- -0.6 to -0.2 --, therefor. |

UNITED STATES PATENT AND TRADEMARK OFFICE
CERTIFICATE OF CORRECTION

PATENT NO. : 7,471,437 B2
APPLICATION NO. : 10/813885
DATED : December 30, 2008
INVENTOR(S) : Jerome R. Lenhard et al.

It is certified that error appears in the above-identified patent and that said Letters Patent is hereby corrected as shown below:

| | |
|---|---|
| Column 47, Line 4 | In Claim 70, delete "electroobromic" and insert -- electrochromic --, therefor. |
| Column 47, Line 6 | In Claim 71, delete "electrocliromic" and insert -- electrochromic --, therefor. |
| Column 47, Line 11 | In Claim 71, delete "$Fe^{3+}$)" and insert -- $Fe^{3+}$), --, therefor. |

Signed and Sealed this

Seventeenth Day of March, 2009

JOHN DOLL
*Acting Director of the United States Patent and Trademark Office*